MAGNETORESISTIVE THIN FILM GRAY TO BINARY CODE CONVERTER

Filed June 24, 1965

INVENTOR
CHARLES H. TOLMAN
BY Thomas J. Nikolai
ATTORNEY 3,436,755

MAGNETORESISTIVE THIN FILM GRAY TO BINARY CODE CONVERTER

Charles H. Tolman, Bloomington, Minn., assignor to Sperry Rand Corporation, New York, N.Y., a corporation of Delaware Filed June 24, 1965, Ser. No. 466,715
Int. Cl. G08c 9/04; H04l 3/00; H03k 13/254
U.S. Cl. 340—347 9 Claims

ABSTRACT OF THE DISCLOSURE

A Gray code to binary code converter utilizing the magnetoresistive properties of thin ferromagnetic film is described. The converter includes a plurality of stages each including a thin ferromagnetic film arranged for receiving parallel input signals representing the word in Gray code and producing a corresponding number of output signals representing the word in binary code. A sense line which is electrically connected to the thin film elements has a current source coupled to it such that changes in the resistance of the thin film element can be detected.

Figure 1:
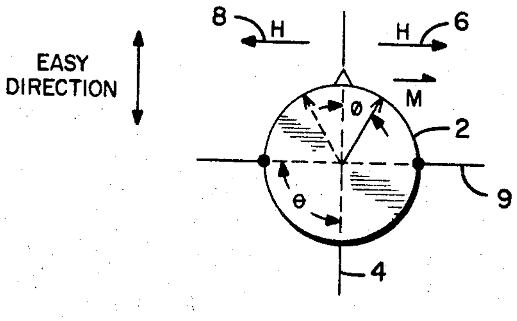

This invention relates to a device for converting the Gray code number system into its binary equivalent. More specifically, the novel feature of this invention is that the conversion from Gray code to binary is accomplished by magnetic thin films utilizing the magnetoresistive effect.

There exists a number code, called the Gray code, that represents the binary number system and which is used in many computer applications. To those who are familiar with the Gray code, its advantages are obvious. The problem involved in using the Gray code is in converting it to the binary number system. Prior art devices for converting the Gray code to the binary code involve relatively large and fairly complicated logic circuits to perform the necessary conversion. For example, see Transistor Circuit Design, J. A. Walston and J. R. Miller, McGraw-Hill Book Company, Inc., New York, 1963, page 487. The present invention improves over the prior art devices by utilizing a smaller and faster decoder which requires only a few magnetic thin films and which requires a relatively simple logic circuit which performs the decoding operation in a very simple manner.

It is old and well known, that the electrical resistivities of iron and nickel change when they are magnetized. See Bozorth, Ferromagnetism, Chapter 16, "Magnetism And Electrical Properties," page 745, D. Van Nostrand Company, Inc., Princeton, N.J., Fourth Printing, 1956. This change in resistivity resulting from the application of a magnetic field to the material in question is known as "magnetoresistance" and the resistance is found to be a maximum when the angle between the resistance measurement sense line and the magnetization vector is zero and is a minimum when the angle is 90°.

Recently, the application of magnetoresistance was extended to magnetic thin films. The thin film is generally defined as a ferromagnetic element having single domain properties. The term "single domain property" may be considered the characteristic of a three-dimensional element of magnetic material having a thin dimension which is substantially less than the width and length thereof wherein no domain walls can exist parallel to the large surface of the element.

In the preferred embodiment of this case, the thin film as defined above possesses the characteristic of uniaxial anisotropy providing an easy axis along which the remanent magnetization vector lies and, further, has substantially rectangular hysteresis loop characteristics.

The present invention extends the use of the magnetoresistive effect to magnetic thin films being used in a Gray code to a binary code converter. Thus, the device converts a word of the form $A_{n-1} \ldots A_i \ldots A_1A_0$ in a first code, the Gray code, to a word of the same form in second code, the binary code, where $A_i=1$ or 0 and where $i=0 \ldots n-1$. The converter includes $n$ stages arranged for receiving parallel input signals representing the word in the first code and producing $n$ parallel output signals representing the word in the second code. Each of the stages includes a first input terminal for receiving an input signal $A_i$ in the first code, a second input terminal for receiving a second input signal, an output terminal for receiving an output signal representative of $A_i$ in the second code, and means coupled to the first and second input terminals and the output terminal for utilizing the first and second input signals to convert $A_i$ from the first code to $A_i$ in the second code. The converter also includes means coupling the second input terminal of the $i$th stage to the output terminal from the $i$th+1 stage where $i \leqq n-2$. The converting means includes a thin film having a rotatable magnetic vector and an electrical resistance variable between first and second values by the application of a magnetic field to the film, a first drive line coupled to the first input terminal and inductively associated with the film for producing the magnetic field which causes the resistance to vary between first and second values when $A_i$ in the first code is applied to the drive line, a second drive line coupled to the second input terminal and inductively associated with the film in parallel arrangement with the first drive line, a sense line coupled to the output terminal and attached to the film at right angles to the drive lines, and a current source coupled to each of the sense lines to establish a current flow through the film, the current flow causing a magnetic field about the sense line the magnitude of which varies between first and second values, the current varying in proportion to the variable film resistance to produce an output signal representative of $A_i$ in the second code, the second input terminal of the $i$th stage being so coupled to the sense line from the preceding $i$th+1 stage, where $i \leqq n-2$, that a first valued magnetic field produced by the sense line cancels the effect of the magnetic field produced by the first drive line of the $i$th stage.

Thus it is an object of this invention to convert the Gray code to the binary code with magnetic thin films utilizing the magnetoresistive effect.

It is another object of this invention to provide a Gray code to a binary code converter in which the magnetoresistive effects of magnetic thin films is employed and where the space requirements are at a minimum, the power of consumption is extremely small, and the speed of operation is in the nanosecond range.

Figures 2, 3:
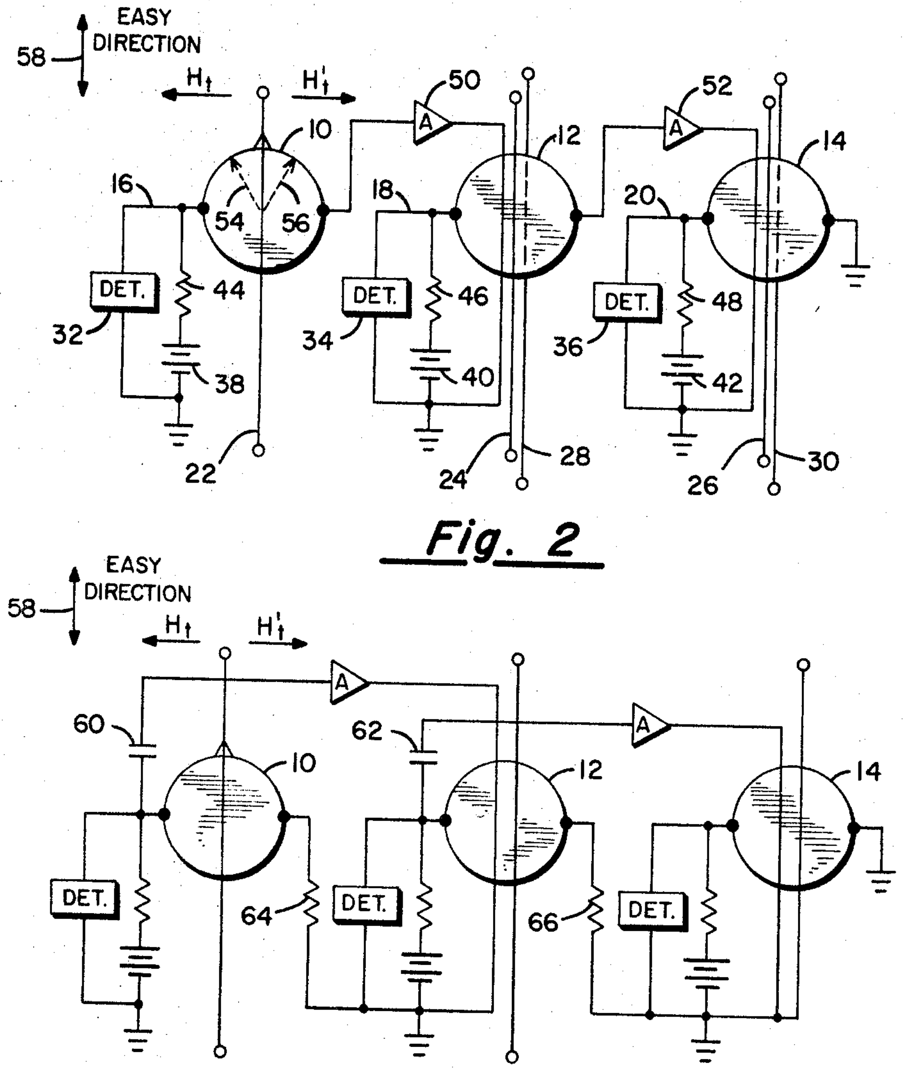

These and other more detailed and specific objects will be disclosed in the course of the following specification, reference being had to the accompanying drawings, in which:

FIG. 1 represents a single thin film together with its drive line and sense line, and FIG. 2 is a circuit of the preferred embodiment of the inventive device in a D.C. coupled arrangement, and FIG. 3 shows the invention embodied in an A.C. coupled arrangement.

The phenomenon of magnetoresistance in magnetic elements displaying single domain properties can be described as the rotation of the magnetization causing a change in the electrical resistance of the material. The application of a magnetic field or the application of a stress to a magnetostrictive film element will, in general, cause a rotation of the magnetization. It has been established that the ohmic resistance R of a film can be expressed by the equation:

$$R=(R_0-R_1)\cos^2\psi+R_1 \quad (1)$$

where $R_0$ and $R_1$ are constants of the magnetic material, $R_0$ being the maximum resistance of the element and the $R_1$ being the minimum resistance of the element. The angle $\psi$ is the angle between the magnetization of the film and direction of resistance measurement.

As can be seen from Equation 1, when the magnetization is parallel to the direction of resistance measurement so that $\psi=0°$ or $180°$, Equation 1 reduces to $$R=R_0 \tag{2}$$

and the resistance is a maximum. However, when the magnetization is perpendicular to the direction of resistance measurement and, thus, $\psi=90°$ or $270°$, Equation 1 reduces to $$R=R_1 \tag{3}$$

and the resistance is a minimum.

FIG. 1 represents a single thin film together with its associated drive line and sense line. Consider the magnetic behavior of the film and its associated change in resistance. The electrical resistance R of film 2 can be represented as $$R=(R_0-R_1)\cos^2(\theta-\phi)\times R_1 \tag{4}$$

where $\theta=$ the angle between the easy axis and the resistance measurement sense line and $\phi=$ the angle between the direction of magnetization and the easy axis of the film ($\psi=\theta-\phi$). When $\theta=90°$ as shown in FIG. 1, then Equation 4 becomes $$R=(R_0-R_1)\sin^2\phi+R_1 \tag{5}$$

where $R_0$ and $R_1$ are constants of the material. With no externally applied magnetic fields, the magnetization direction is perpendicular to the resistance measurement sense line and rests along the easy axis ($\phi=0°$). Thus, the corresponding resistance is from equation $$R=R_1 \tag{6}$$

and the resistance is at a minimum. If a current is passed through the drive line 4 so that a transverse field 6 is produced, the magnetization will rotate clockwise through an angle $\phi$ according to the relation $$\sin\phi=H/H_k \tag{7}$$

where H is the applied transverse field and $H_k$ is the anisotropy field of the film. The resistance of the film after the rotation of the magnetization is expressed by Equation 5. The change in resistance, $\Delta R$, upon rotation of magnetization through the angle $\phi$ is $$\Delta R=(R_0-R_1)\sin^2\phi \tag{8}$$

and is the difference in resistance expressed by Equations 5 and 6. If a current is passed through drive line 4 so that a transverse field of opposite direction 8 is applied to the film, the magnetization rotates countercloskwise. This rotation can be described by a negative $\phi$, but the change is resistance $\Delta R$ as described in Equation 8 is the same for positive or negative values of $\phi$ of the same magnitude. If a current is passed through the resistance measurement sense line 9, a rotation of the magnetization vector will cause the film resistance to vary and thus will cause the current through the film on sense line 9 to vary accordingly.

Consider the preferred embodiment of the inventive device shown in FIG. 2. Thin films 10, 12, and 14 have inductively associated therewith drive lines 22, 24, and 26, respectively. Further, films 10, 12, and 14 have attached thereto resistance measurement sense lines 16, 18, and 20, respectively. Battery 38 causes a continual current to flow through resistor 44, sense line 16, and thin film 10. Similarly, battery 40 causes a continual current to flow through resistor 46, sense line 18, and thin film 12. Likewise, battery 42 causes a continual current to flow through resistor 48, sense line 20, and thin film 14. Consider now a current pulse $A_{n-1}$ that is applied to drive line 22 which is inductively associated with film 10 in FIG. 2. Depending upon which direction the current flows through drive line 22, a transverse magnetic field $H_t$ or $H'_t$ will be produced which will cause the magnetic vector to rotate either counterclockwise or clockwise as shown by vectors 54 and 56 in FIG. 2. As shown in Equation 8 above, the resistance of the thin film 10 will change according to the value of the angle $\phi$ through which the magnetization is rotated in either the clockwise or the counterclockwise direction. Since the resistance of film 10 will change, the current through the film 10 will also change and a variable voltage drop can be detected across thin film 10. The voltage change across thin film 10 is detected by detector 32 and represents, as will be explained later, a "1" or "0" digit in the binary code. The current flow through sense line 16 produces a magnetic field which is coupled to thin film 12. Thus, the steady-state current flow through thin film 10 on sense line 16 causes a magnetic field which is continually inductively coupled to thin film 12 and will, of course, cause the magnetization vector of thin film 12 to rotate in a clockwise or a counterclockwise direction depending upon the direction in which the current flows through sense line 16. In order to compensate for this D.C. bias field which is generated by the D.C. current passing through sense line 16 and inductively coupled to film 12, auxiliary drive line 28 is inductively coupled to film 12 and a current is passed through drive line 28 in such a direction as to produce a D.C. bias field which cancels that steady-state bias field generated by the current flow in sense line 16. Similarly, the current flow through sense line 18 which is attached to thin film 12 also produces a D.C. bias field which is inductively coupled to thin film 14. Again, in order to compensate for this small D.C. bias field, auxiliary drive line 30 is inductively coupled to thin film 14 and a current of such magnitude and in such direction is applied to auxiliary drive line 30 that the D.C. bias field generated by the current flow in sense line 18 is cancelled. Thus, in the steady-state condition with no drive signals applied to drive lines 22, 24, and 26, the magnetization vector of each of thin films 10, 12, and 14 is aligned in the easy direction as shown by arrow 58 and each of the films has a resistance which is a minimum because, as explained previously, the resistance of the films is a minimum when the magnetization vector is perpendicular to the resistance measurement sense line. Amplifiers 50 and 52 are used whenever necessary to amplify the signals on sense lines 16 and 18 to a predetermined level.

Consider now a specific example of converting a Gray code number into its binary equivalent. Assume that a 101 in Gray code has been received and is to be decoded. The current pulses representing the 101 in Gray code are applied to drive lines 22, 24, and 26, respectively. In practice, this would mean a current pulse is applied to drive line 22 and is representative of a "1," no current is applied to line 24 and thus represents a "0," and a current pulse is applied to line 26 and is representative of a "1." The current pulse on line 22 which represents a "1" produces a transverse magnetic field which causes the magnetization vector of thin film 10 to rotate, thus changing the resistance of film 10. This change in film resistance causes the current flow through sense line 16 to change and the change in current flow is detected by detector 32 as a "1" in the binary code. This current change in sense line 16 is coupled to thin film 12 by amplifier 50 and, because sense line 16 is inductively coupled to film 12, the change in current flow through sense line 16 produces a net increase in the transverse field which is applied to thin film 12 by sense line 16, drive line 24 and auxiliary drive line 28. Thus, the magnetization vector of film 12 is caused to rotate. Because drive line 24 has no signal applied to it and, thus, which represents a "0," the rotation of the magnetic vector caused by the change in current in sense line 16 is not cancelled and therefore a change in resistance of film 12 is produced which causes a change in current on sense line 18 which is detected by detector 34 as a "1." The change in current flow through film 12 on sense line 18 is coupled by amplifier 52 to thin film 14. This change in current flow produces a net increase in the transverse magnetic field which is inductively coupled in one direction to thin film 14 and which causes the magnetic vector to rotate. However, the current pulse representing a "1" which is applied to a drive line 26 produces a transverse magnetic field which is applied in such a direction as to rotate the magnetic vector of film 14 in a direction opposite that caused by the change in current flow through sense line 18. In other words, it is equal and opposite to the field caused by sense line 18. Thus, although the current flow through sense line 18 would cause the magnetic vector to rotate in one direction, the pulse representing the "1" which is applied to drive line 26 would cause a rotation of the magnetic vector through an equal angle in an opposite direction and thus no rotation is realized, and the magnetization remains aligned in the direction of the easy axis. Thus, no change in current is detected through film 14 since the magnetization vector has remained in its original position and is not changed, and therefore detector 36 does not detect a voltage change across thin film 14 but detects a zero. Thus, it can be seen that with a 101 Gray code input on drive lines 22, 24, and 26, respectively, detectors 32, 34, and 36, respectively, produce outputs of 1, 1, and 0 which is the binary counterpart of the Gray code 101. Similar examples will complete the table below.

It is obvious that the circuitry shown in FIG. 2 could be expanded to decode a Gray code word of the form $A_{n-1} \ldots A_i \ldots A_1A_0$ merely by increasing the numbers of films and the associated drive and sense lines as shown in FIG. 2.

The converter described above in a D.C. coupled device, and requires the bias cancelling lines 28 and 30. FIG. 3 shows an A.C. coupled arrangement that eliminates lines 28 and 30. Capacitor 60 and 62 are added for the A.C. coupling, and resistors 64 and 66 are optional additions to increase the voltage developed across the capacitors. Thus, the signal flowing in the coupling sense lines is only the time varying portion and no D.C. level is present.

TABLE

| Binary | Decimal | Gray code |
|---|---|---|
| 000 | 0 | 000 |
| 001 | 1 | 001 |
| 010 | 2 | 011 |
| 011 | 3 | 010 |
| 100 | 4 | 110 |
| 101 | 5 | 111 |
| 110 | 6 | 101 |
| 111 | 7 | 100 |
| 1000 | 8 | 1100 |
| 1001 | 9 | 1101 |
| 1010 | 10 | 1111 |
| 1011 | 11 | 1110 |
| 1100 | 12 | 1010 |
| 1101 | 13 | 1011 |
| 1110 | 14 | 1001 |
| 1111 | 15 | 1000 |

Thus the Gray code to binary converter described in this specification has many advantages. Since magnetic thin films are employed, the space requirements are at a minimum, the power consumption is extremely small, and the speed of operation should be in the nanosecond range.

From Equation 4 it is obvious that $\theta$ could be 0° and thus the sense line could be attached to the film in a direction parallel to the film easy axis. A rotation of the magnetic vector in either direction would cause a decrease in film resistance. Thus, this arrangement could also be used in the present invention provided the proper polarities of all voltages are observed.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A code converter for converting a word of the form $A_{n-1} \ldots A_i \ldots A_1A_0$ in a first code to a word of the same form in a second code where $A_i$=1 or 0 and where $i$=0 . . . $n$−1, said converter comprising:

(a) a thin film having an easy axis, a rotatable magnetic vector and an electrical resistance variable between first and second values by the application of a magnetic field to said film, (b) a first drive line coupled to a first input terminal adapted to receive an input signal $A_i$ in said first code and inductively coupled to said film for producing said magnetic field causing said resistance to vary between said first and second values when $A_i$ in said first code is applied to said drive line, (c) a second drive line coupled to a second input terminal inductively coupled to said film in parallel arrangement with said first drive line, (d) a sense line coupled to an output terminal for receiving an output signal representative of $A_i$ in said second code and electrically connected to said film and (e) a current source coupled to each of said sense lines to establish a current flow through said film, said current flow causing a magnetic field about said sense line, the magnitude of which varies between first and second values, said current varying in proportion to the variable film resistance to produce an output signal representative to $A_i$ in said second code, said second input terminal of the $i$th stage being so coupled to the sense line from the preceding $i$th+1 stage, where $i \leqq n-2$, that a first valued magnetic field produced by said sense line from said preceding stage cancels the effect of the magnetic field produced by said drive line of the $i$th stage.

2. A code converter as in claim 1 wherein when said signal on said output terminal is a 1, said first and second inputs are both 0.

3. A code converter as in claim 1 wherein when said output signal on said output terminal is a 0, said first and second inputs are both 1.

4. A code converter as in claim 1 wherein said first code is the Gray code and said second code is the binary code.

5. A code converter as in claim 1 wherein said sense line is attached to said thin film at right angles to said easy axis.

6. A code converter as in claim 1 wherein said sense line is attached to said thin film in a direction parallel to said easy axis.

7. A code converter for converting a word of the form $A_{n-1} \ldots A_i \ldots A_1O_0$ in a first code to a word of the same form in a second code where $A_i$=1 or 0 and where $i$=0 . . . $n$−1, said converter comprising (a) $n$ stages arranged for receiving parallel input signals representing said word in said first code and producing $n$ parallel output signals representing said word in said second code, each of said $n$ stages comprising (1) a thin film having an easy axis, a rotatable magnetic vector and an electrical resistance variable between first and second values by the application of a magnetic field to said film, (2) a first drive line inductively associated with said film for producing said magnetic field which which causes said resistance to vary between said first and second values when $A_i$ in said first code is applied to said drive line, (3) a second drive line inductively associated with said film in parallel arrangement with said first drive line, (4) a sense line atached to said film and (5) a current source coupled to said sense line to establish a current flow through said film, said current flow causing a magnetic field about said sense line the magnitude of which varies between first and seiond values, said current varying in proportion to the variable film resistance to produce an output signal representative of $A_i$ in said second code, and (b) means coupling said second drive line of each stage to said sense line from the preceding $i$th+1 stage where $i \leqq n-2$ such that said first valued magnetic field produced by said sense line cancels the magnetic field produced by said first drive line of the $i$th stage.

8. A code converter as in claim 7 wherein said sense line is attached to said thin film at right angles to said easy axis.

9. A code converter as in claim 7 wherein said sense line is attached to said thin film in a direction parallel to said easy axis.

References Cited

UNITED STATES PATENTS 3,108,203 10/1963 Crowell ------------ 315—8.5

OTHER REFERENCES

Magnetoresistive Readout For 200-Nsec. TF Memory, vol. 10, p. 31, Electronic Design, Mar. 15, 1962.

MAYNARD R. WILBUR, *Primary Examiner.*

CHARLES D. MILLER, *Assistant Examiner.*

U.S. Cl. X.R.

340—174